:::
United States Patent [19]

Zarouni

[11] 4,124,775
[45] Nov. 7, 1978

[54] COIN BOX REMOVAL INFORMATION PROCESSING ARRANGEMENT

[75] Inventor: Alfred Zarouni, Middletown, N.J.

[73] Assignee: Bell Telephone Laboratories, Incorporated, Murray Hill, N.J.

[21] Appl. No.: 868,042

[22] Filed: Jan. 9, 1978

[51] Int. Cl.² .............................................. H04M 17/00
[52] U.S. Cl. ................................. 179/6.3 R; 194/1 N; 179/6.5
[58] Field of Search ..................... 179/6.3 R, 6.4, 6.31, 179/6.5; 235/92 CN, 92 TE, 91 E; 194/1 L, 1 M, 1 N

[56] References Cited

U.S. PATENT DOCUMENTS

| 3,814,907 | 6/1974 | Edington et al. | 179/6.3 R |
| 3,825,729 | 7/1974 | Menke | 235/92 CN |
| 4,028,494 | 6/1977 | Zarouni | 179/6.3 R |
| 4,039,768 | 8/1977 | O'Maley | 179/6.3 R |
| 4,041,243 | 8/1977 | Zarouni | 179/6.3 R |

Primary Examiner—Kathleen H. Claffy
Assistant Examiner—Gerald L. Brigance
Attorney, Agent, or Firm—Frederick W. Padden

[57] ABSTRACT

Automatic coin telephone station and central office systems have advanced recently to the point where facilities have been designed for accumulating at a centralized location data on the exact numbers and types of coins deposited in coin phones. This disclosure presents an arrangement for automatically processing a coin box removal signal (88) from a coin telephone station (1) to the central office (6) so that a determination can be made of the exact numbers and types of coins in the coin box at the time of its removal from the coin phone for collection. Each station is equipped with memories (16, 17, 18) for three different types of coins and a coin box removal memory (83). Flip-flop and logic gating control circuitry (26) is responsive to interrogate and coin collect signals received from a central office for sequentially interrogating the memories and frequency shift keying the stored information to the central office. Coin processor and memory circuitry (60) in the central office interrogate the memories (16, 17, 18, 83) for initial and overtime deposits and coin box removal data and then store and accumulate the actual coin denominations for correlation in connection with coin box fill determinations and collection scheduling as well as the ascertaining of the exact numbers and types of coins in the coin box at the time of its removal from the phone.

17 Claims, 2 Drawing Figures

COIN BOX REMOVAL INFORMATION PROCESSING ARRANGEMENT

TECHNICAL FIELD

This invention relates to coin telephone station facilities and particularly to an arrangement for automatically processing coin box removal information from the station to a centralized location after that box has been withdrawn from the coin phone for coin collection.

BACKGROUND ART

Despite telephone industry improvement programs to provide coin telephone service innovations, the scheduling and collection of paystation coin boxes has to some degree been inefficient and costly. The scheduling procedure has proven deficient because inadequate information has been available on the coin box fill. High cost and inefficiency arise in the collection arrangements because many precautionary measures are used to safeguard against employee theft following the removal of the coin box from the paystation. These precautions are taken because there is insufficient accumulated data concerning the total amount of money in a collected box.

Heretofore, the telephone industry has resorted to integrity checking practices such as predepositing a number of different marked coins in selected coin boxes and then ascertaining the presence of such coins during coin counting operations. If any marked coin is found to be missing, it is determined that there is an integrity problem. Such practices obviously consume a substantial amount of personnel time and expenses.

In order to improve coin box collection scheduling and to provide limited protection against coin theft by employees, automatic coin station and central office facilities were recently designed for deriving precise data on the numbers and types of coins deposited in paystations. These facilities determine when coin boxes have been adequately filled and require collection. Such facilities are disclosed in a copending U.S. patent application Ser. No. 819,244, filed July 27, 1977.

In accordance with that disclosure, a coin information processing arrangement is provided in which a coin telephone station is equipped with a coin box for storing deposited coins, a station memory for registering data signals for the station, and a memory control circuit that is responsive to a control signal for examining the memory to readout the registered data signals. To elaborate, each station is equipped with memories for three different types of coins, such as nickels, dimes and quarters, and with the memory control circuit which is responsive to signals received from a central office for sequentially interrogating the memories to effect a sending of the stored information to the central office during memory readout, coin collect and overtime deposit check operations. The central office facilities include a coin processor which cooperates with coin supervisory circuits to identify the calling station, to interrogate the memories at that station for the initial and overtime deposits needed for the continuation or termination of the call, and then to store the actual coin denominations for subsequent processing and correlation in connection with coin box collection scheduling.

Although the foregoing facilities are capable of determining when a coin box should be scheduled for collection based on accumulated coin box fill information, it has been a recognized problem that they are incapable of specifying the exact numbers and types of coins in that box when it is actually removed from the paystation. The problem arises because no means is provided in those facilities for automatically ascertaining and reporting when a coin box has actually been removed for coin collection. As a consequence, the prior art coin processor can determine at a centralized location that a station coin box should be collected because it is adequately filled and can specify that the box will contain minimum numbers of different types of coins. However, it cannot specify the exact amount of money which will be in the box when it is actually collected because time elapses between the decision to collect the box and its actual collection. During the elapsed time, many calls may be originated from the coin phone and additional money can be collected in the coin box. The prior art is incapable of accurately accounting for the additional money without knowing the exact time that the coin box is removed from the paystation phone. Resultingly, coin box theft can yet occur in the prior art systems.

DISCLOSURE OF THE INVENTION

The foregoing problem is solved and a technical advance is achieved by an arrangement which automatically ascertains when a coin box is removed from a paystation, stores a coin box removal signal in a station memory, and then reads out and transmits the stored signal to a central office during coin collect and interrogate operations for the next call originated from that station. This arrangement enables the coin box removal to be correlated with totalized coin information accumulated in a central office coin processor so that the exact numbers and types of coins in the removed coin box can be precisely identified.

This invention is integrated into a coin station and central office system of the type disclosed in the aforementioned patent application. It is equipped with the station memory for temporarily storing information on the numbers and types of different coins deposited on a call. The memory control circuit is provided for controlling the transferring of the stored information over a conventional telephone station line to a coin processor at a central office while the call is in progress. The coin information is transferred on coin collect and interrogate operations and is then erased from the station memory. The coin processor accumulates data on the numbers and types of coins deposited on many calls from the coin station and determines when its coin box is adequately filled so as to require collection.

The coin box removal arrangement is operated on each call to report whether the coin box has or has not been collected. When a coin box has not been collected, the central office coin processor continues to accumulate and totalize deposited coin data. Upon collection of the box, the central office coin processor will have accumulated data which identifies totals for the exact numbers and types of coins in that box. All that it needs to complete the coin accounting job is information that the box has in fact been collected. This invention is arranged to provide that information by detecting the coin box removal and then storing that occurrence in a memory at the coin station. Thereafter, on the next call originating from that station, the central office equipment effects a readout of the coin box memory so that accumulated coin information for the collected box can be specified for coin accounting personnel.

The coin box removal facilities include memory circuitry at the coin station for storing box removal information. It is activated by a pressure sensitive switch and electrical network in response to the removal of the coin box for collection. The memory circuitry thereafter retains the stored information for transmission to the central office until a coin collect operation occurs on the next call from the coin station. In response to coin collect or interrogate signals from the central office, apparatus in the memory control circuit is operated to read a plurality of coin memories which store the numbers and types of coins deposited on that call and then to read the coin box removal memory. The information read from all of these memories is sequentially sent to the coin processor at the central office.

The memory control circuit is equipped with a ring counter, flip-flop and logic gates for effecting the sequential readout of the coin memories and the coin box removal memory. An aspect of this invention is that the coin box removal memory includes a bistable memory for storing the removal data and read out gates which are enabled by a coin box stage of the ring counter for sending the stored data to the central office. A reset gate in the coin removal circuitry is controlled both by a reset stage of the ring counter and by coin return logic circuitry to enable the erasure of a stored coin box removal signal only on a coin collect operation of the station apparatus.

Figure 1:
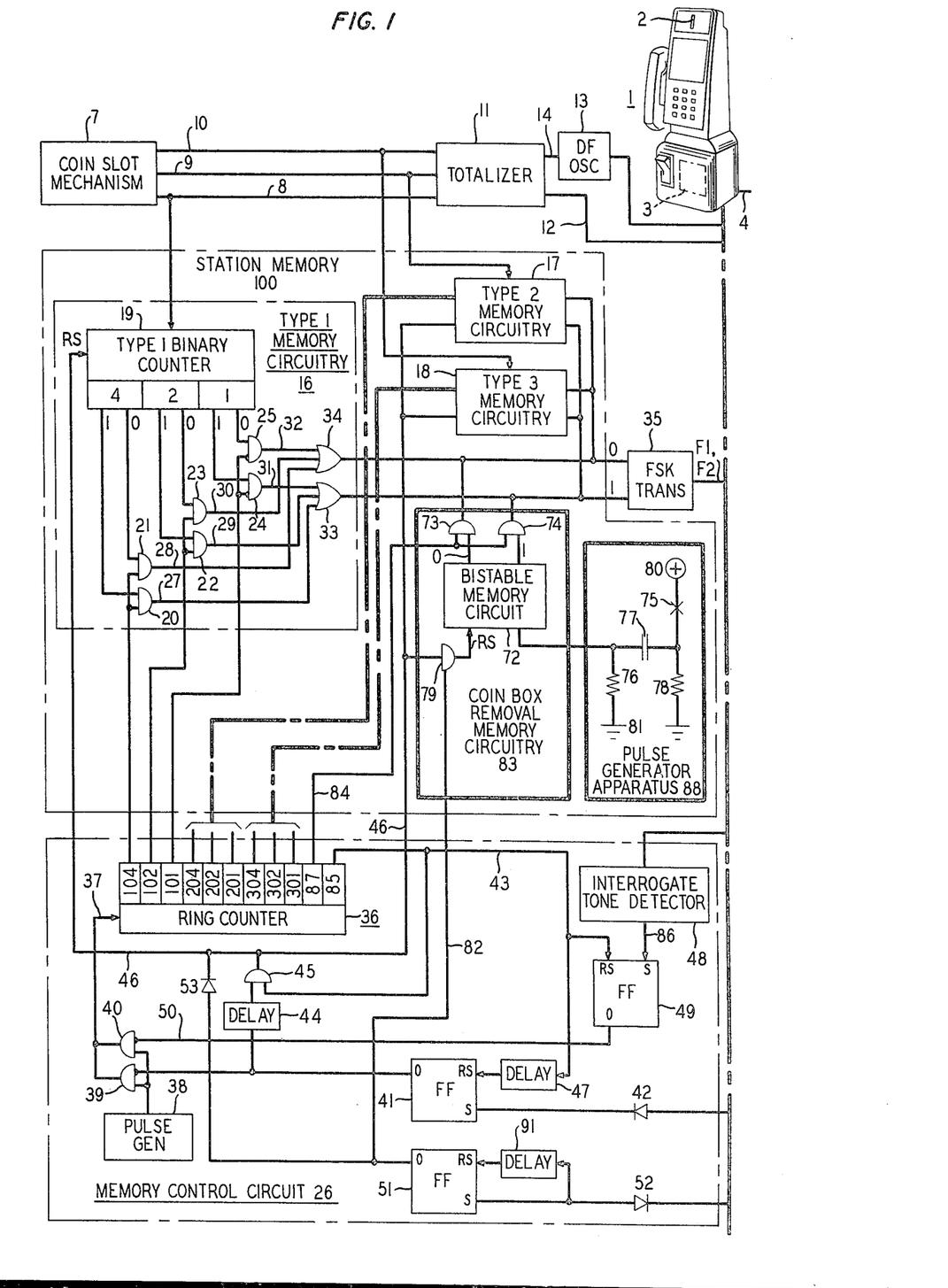
FIG. 1 shows, in block schematic form, the interrelation of the coin station set memory and memory control circuitry together with a coin box removal memory and a pulse generator shown in heavy line boxes.
Figure 2:
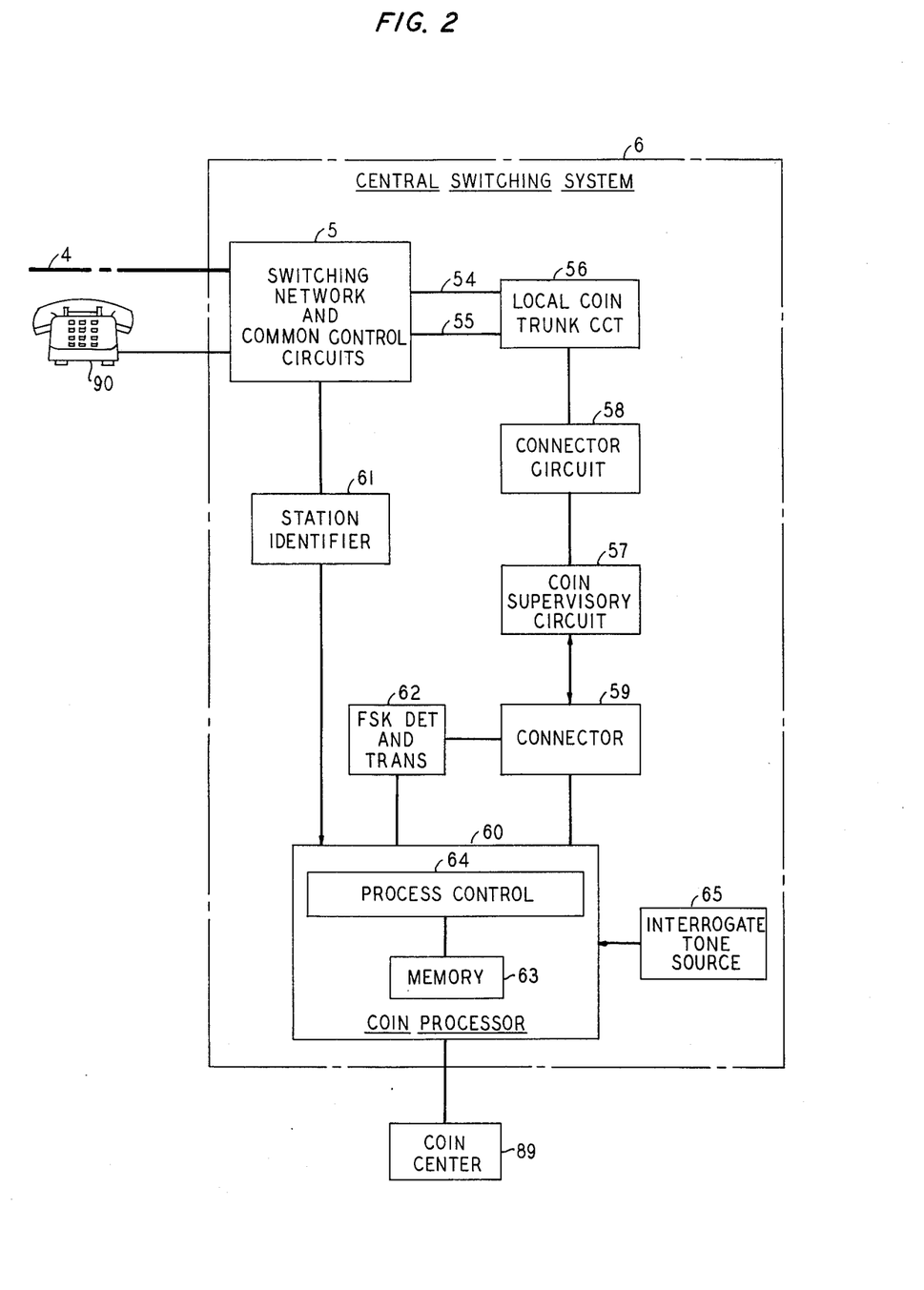
FIG. 2 depicts a central switching system with coin call control and processing apparatus.

The circuitry of FIG. 1 may advantageously be terminated for coin telephone call processing in a local automatic central switching system of FIG. 2 wherein common control circuits are employed to control the establishment of local and toll calls through a switching network. One such system is well known in the art as No. 5 Crossbar, an early version of which is disclosed in A. J. Busch U.S. Pat. No. 2,585,904, issued Feb. 19, 1952. It is to be understood that the present invention is not limited to use in No. 5 Crossbar configurations, but may be utilized with other types of call switching and service systems.

The invention described herein is embodied in a No. 5 type system. It is particularly concerned with the coin station apparatus including the circuitry which is represented by the blocks shown in heavy lines in FIG. 1. The other equipment units are neither shown nor described in detail herein except where necessary for a complete understanding of the invention.

BEST MODE FOR CARRYING OUT THE INVENTION

Coin Station Memory and Control Circuits

The general organization of the principal equipment units of the coin station will now be explained with reference to FIGS. 1 and 2. FIG. 1 shows a coin box station set 1 having a conventional handset, a single coin slot 2 and a coin storing box 3. Set 1 is connected over a telephone line 4 to a termination in a switching network 5 of a central switching system 6. First, second and third type coins, such as nickels, dimes and quarters deposited in slot 2 for call service actuate a conventional coin slot mechanism 7 to generate corresponding coin signals on leads 8, 9 and 10 which are then totalized on a totalizer 11. An output 12 of totalizer 11 in turn supplies a call organization signal to line 4 when an appropriate initial coin deposit has been made. Concurrently, totalizer 11 also activates a DF (dual frequency) oscillator 13 over a lead 14 for sending known combinations of tones over a station line 4 to switching office 6. These tones are thereafter selectively interpreted by equipment in office 6 for determining the adequacy of the deposit for the original call.

Station 1 is equipped with a station memory 100 having a coin memory including first, second and third memories 16, 17 and 18 for storing data on deposited coins of respective first, second and third denominations. Station 1 is advantageously furnished with a coin box removal memory circuitry 83 for storing a signal signifying that the coin box 3 is removed for coin collection by a coin box collector. The first, second and third coin memories are essentially the same. Therefore, only the schematic details of the memory circuit 16 are disclosed in FIG. 1 while the other two coin memories 17 and 18 are shown in block diagram form. Circuit 16 includes a coin type 1 binary counter 19 having three stages 1, 2 and 4 for counting a maximum of seven deposited coins of type 1. Counter 19 is stepped from stage-to-stage in response to type 1 coin signals on lead 8 and thereby stores the total number of type 1 coins actually deposited on each call. Each of the stages 1, 2 and 4 has "0" and "1" outputs which are individually connected to a respective individual one of the inputs of "AND" gates 20–25. Each of the latter gates has another individual input which is connected to a memory control circuit 26 for controlled readout of counter 19. Outputs 27–32 of gates 20–25 are extended through "OR" gates 33 and 34 to operate an FSK (frequency shift keying) transmitter 35 for sending FSK signals representing coin types 1, 2 and 3 data over line 4 to switching system 6.

Circuit 83 includes a single stage bistable memory circuit 72, such as a flip-flop, having a "0" and a "1" output which are connected to gates 73 and 74. Each of the gates 73 and 74 has another individual input which is connected over lead 84 to a memory control circuit 26 for controlled activation and readout of circuit 83. Each of the gates 73 and 74 has an output which is used to operate the FSK transmitter 35. The FSK signal, in this case, indicates whether a coin box removal has taken place since the last call originated from station 1. Memory circuit 72 has "0" and "1" states and normally rests in its "0" state. When coin box 3 is removed for collection, pressure switch 75 in a pulse generator 88 is operated to detect the removal. This operation in conjunction with the positive and ground voltages 80 and 81 and the differentiating network components comprising resistor 76 and capacitor 77 form pulse generator circuitry 88 which switches memory circuit 72 into its "1" state. Resistor 78 is used to bleed off the charge stored on capacitor 77 once a coin box is replaced and switch 75 is thereupon again opened.

Memory control circuit 26 is illustratively equipped with an eleven-stage ring counter 36 including stages 104, 102, 101, 204, 202, 201, 304, 302, 301 and 87. The first numeric of the designation of the stages identifies the type of coin with which it is associated. These stages have outputs which are selectively utilized for sequentially enabling gates 20–25, 73 and 74 and other gates (not shown) of memories 17 and 18 to interrogate and readout stored coin deposit data from the type 1, 2 and 3 binary counters and the coin box removal signal information from circuit 72 and, resultingly, to send it over line 4 to switching system 6. Ring counter 36 also has a reset stage 85 which is selectively used for concurrently resetting the binary counters of circuits 16, 17 and 18 and the memory circuit 72 as well as strategic flip-flops used for controlling the counter and memory readouts on coin collect, interrogation, and coin return operations as later explained.

Counter 36 is selectively stepped from its initial or rest state of stage 85 through stages 104, 102, 101, 204, 202, 201, 304, 302, 301 and 87 and thence again to its stage 85 under control of pulses applied to its drive input 37 from a pulse generator 38 via either a coin collect "AND" gate 39 or an interrogate "AND" gate 40.

To effect a readout of the binary counters in coin memories 16, 17 and 18 each of the gates 20–25 (and counterpart gates in memories 17 and 18) is sequentially and partially enabled by the respective coin stages 104, 102, 101, 204, 202, 201, 304, 302 and 301. Counter stage 87 also partially enables the coin box removal "AND" gates 73 and 74. Each of the coin stages partially enables a pair of gates associated with respective "0" and "1" outputs of a binary counter stage. Illustratively, stage 104 of the counter 36 partially enables gates 20 and 21 associated with the respective "0" and "1" outputs of stage 4 of binary counter 19. Only one of the "0" and "1" outputs of stage 4 contains a single voltage for fully enabling the associated gate 20 or 21 to pass a signal through gate 33 or 34 for activating the FSK transmitter 35. Gate 33 is effective for identifying a binary "1" stored in an interrogated counter stage. Similarly, gate 34 is associated with a binary "0" stored in an interrogated counter stage. Output signals from gates 33 and 34 are applied to respective "0" and "1" inputs of FSK transmitter 35 for sending signals of frequencies $F_1$ and $F_2$ respectively over line 4 to switching system 6. A sequential readout and FSK signaling of the binary data stored in each of the memories 16, 17 and 18 for seven type 1, 2 or 3 coins illustratively depositable in coin set 1 is in accordance with the following table:

| Number of Coins | | | |
|---|---|---|---|
| none | 0 | 0 | 0 |
| one | 0 | 0 | 1 |
| two | 0 | 1 | 0 |
| three | 0 | 1 | 1 |
| four | 1 | 0 | 0 |
| five | 1 | 0 | 1 |
| six | 1 | 1 | 0 |
| seven | 1 | 1 | 1 |
| Binary "0" - FSK frequency $F_1$ | | | |
| Binary "1" - FSK frequency $F_2$ | | | |

In accordance with the foregoing table, and to illustrate the presence of six type 1, 2 or 3 coins registered in memory 16, 17 or 18, a binary number 110 is stored in such memory and gate 33 is sequentially and successively enabled twice and the gate 34 is enabled once to activate the FSK transmitter 35 for successively transmitting FSK frequencies $F_1F_1F_0$ over line 4 to indicate the stored coin data. To expand the example, assume that five type 1, zero type 2 and two type 3 coins are deposited in slot 2 and corresponding binary numbers are stored in the type 1, 2 and 3 memories. As a result, station set 1 sends over line 4 under sequential control of the memory control circuit 26 the following sequence of FSK tones: $F_1F_0F_1 + F_0F_0F_0 + F_0F_1F_0$. Elaborating still further, assume that the coin box had not been collected since the last call had been made. There would be a "0" transmitted for this case and the complete sequence of FSK tones would be:

$$F_1F_0F_1 + F_0F_0F_0 + F_0F_1F_0 + F_0.$$

If a coin box has been collected the sequence would be:

$$F_1F_0F_1 + F_0F_0F_0 + F_0F_1F_0 + F_1.$$

This signal data is received, translated, processed and recorded in memory at switching system 6 as later described for determining the adequacy of the deposit for call service and the exact numbers of types 1, 2 and 3 coins in a coin box 3. If an indication was received that a coin box had been collected since the last call was made, the switching system 6 with coin processor 60 provide to the coin center 89 a totalized record of the numbers and types of coins in the collected box and then erases the centralized memory 63 for the collected box to begin a new count on the numbers of types 1, 2 and 3 coins collected in a new coin box. It does so on each call following the collection of the box by reading the type 1, 2 and 3 coin memories of station 1 and then recording these counts in memory 63 as already described.

Since the exact numbers of types 1, 2 and 3 coins in the coin box 3 at the time of collection are known, the complete content of the coin box can be determined, thus permitting an elimination of the counting function at the coin center as well as providing precise means for determining employee misappropriation.

For coin collect operations, +130 volts is applied to line 4 at the switching system 6 for actuating electromechanical coin collect apparatus (not shown) of set 1 and thereby effecting collection of deposited coins in the conventional manner. The same +130 volt signal causes an operation of a coin collect flip-flop 41 for initiating a readout of the memory circuits 16, 17, 18 and 72 and the FSK signaling to the switching system 6 of signals representing the precise numbers of deposited types 1, 2 and 3 coins as well as a coin box removal indication. The operation of flip-flop 41 is effected by extending the +130 volt signal from line 4 via diode 42 to a set input of flip-flop 41. In operating, a "0" output of flip-flop 41 enables gate 39 to apply pulses from generator 38 to input 37 for successively stepping ring counter 36 from stage 85 through stages 104, 102, 101, 204, 202, 201, 304, 302, 301 and 87 and again to 85. As it does so, gates, such as gates, 20–25, 33 and 34, in circuits 16, 17 and 18 are sequentially enabled to pass the stored type 1, 2 and 3 coin data signals and gates 73 and 74 are subsequently enabled to pass the stored coin box removal signal from the memory circuit 72 to switching system 6 by means of FSK signaling under control of FSK transmitter 35 and line 4. Upon the stepping of counter 36 again to stage 85, a reset signal is sent from the output of that stage over lead 43 through the flip-flop 41 and delay circuit 44 enabled gate 45 and lead 46 to the reset inputs of the type 1, 2 and 3 binary counters, such as counter 19, and coin box removal memory circuit 72 for effecting their resetting and an erasure of the stored coin and coin box removal information. A reset controlling "AND" gate 79 is included in the coin box removal circuitry 83 for enabling the reset operations on coin collect and interrogate functions while inhibiting a resetting of memory 72 and an erasure of stored coin box removal information on coin return operations. Gate 79 is controlled by flip-flop 51 to enable a resetting of memory 72 over line 82 in response to a reset signal on lead 46 whenever flip-flop 51 is in its "0" state. After a suitable time delay to accomplish that resetting, the reset signal on lead 43 is extended through a delay circuit 47 to a reset input of flip-flop 41 for effecting its reset and a resulting disabling of gate 45. Delay circuit 44 is interposed between the "0" output of flip-flop 41 and an enable input of gate 45 so that the coin and coin box removal memory circuits 16, 17, 18 and 72 are not reset when flip-flop 41 is initially switched to its set state and counter 36 yet rests on its stage 85. Circuit 44 delays the full enabling of gate 45 until after counter 36 steps from stage 85 to stage 104.

The coin station structure also facilitates an interrogation and readout of the type 1, 2 and 3 coin memories 16, 17 and 18 and the coin box removal memory 83 without any erasing of stored coin information as is done on coin collect and return jobs. Such an interrogation is made for checking the adequacy of coin deposits during initial and overtime periods. An interrogation is made by the structure of FIG. 1 in response to an application of an interrogate tone to the calling line 4 at the switching office end. The applied tone activates an interrogate tone detector 48 which, in turn, generates a signal on lead 86 to the set input of an interrogate flip-flop 49 for switching it to its set state. In doing so, a "0" output of flip-flop 49 enables the interrogate "AND" gate 40 over lead 50 to apply pulses from generator 38 to the drive input 37 of counter 36 and thereby step it from stage 85 through stages 104, 102, 101, 204, 202, 201, 304, 302, 301, 87 and again to stage 85. A readout of the memory binary counters and the memory circuit 72 is thereby effected and the deposited coin and coin box removal information transmitted over line 4 toward the switching system 6 as priorly explained with respect to coin collect operations. Upon again stepping to stage 85, counter 36 applies a reset signal over lead 43 to a reset input of flip-flop 49 for immediately effecting its reset and, in turn, switching its "0" output to effect a disabling of gate 40 and thereby an inhibiting of further stepping of counter 36 beyond its 85 stage. No resetting of the binary counters in circuits 16, 17 and 18 or of the coin box removal memory 83 occurs due to the reset signal on lead 43 at this time because gate 45 is inhibited under control of the delay circuit 44 and the "0" output of flip-flop 41 being in its reset state.

Coin return operations are accomplished by the coin station set 1 in response to a conventional −130 volt coin return signal applied to line 4 from the switching office end. The return of deposited coins requires that the memory circuits 16, 17 and 18 be erased without any readout. To do so, the coin station structure includes a coin return flip-flop 51 which is responsive to the −130 volt signal applied to its set input via a diode 52 from line 4 for immediately generating a reset signal at its "0" output for extension via diode 53 and lead 46 to reset memory circuits 16, 17 and 18 and thereby erase store coin deposit information from those memories. After a delay sufficient to cause the erasure, flip-flop 51 is itself reset by an extension of the −130 volt signal from line 4 through diode 52 and delay circuit 91 to a reset input of flip-flop 51.

For the coin return operation, coin box removal memory circuit 72 remains set if it had been previously set by a coin box removal allowing switch 75 to operate. The reset pulse on lead 46 is inhibited from effecting a resetting of memory 72 because flip-flop 51 is set and the "AND" gate 79 is disabled. The coin box removal signal will remain stored in memory 72 and an indication will then be transmitted to the switching network 5 on the next call from station 1 involving a coin collect and/or interrogation of circuits 16, 17, 18 and 72.

The structure of FIG. 1 may be operated at any time during the processing of coin calls whenever it is desired to determine the amount or adequacy of coin deposits or to recycle the coin and coin box removal memory circeits 16, 17, 18 and 72 incident to coin collect and return jobs. Illustratively, the interrogate tone, +130 volt coin collect signal or −130 volt coin return signal is selectively applicable to the station line 4 from the switching system and thereof during the preinitial period, the initial period and one or more overtime periods of a local or toll coin call to perform the previously described operations of the FIG. 1 circuitry, including the readout and erasure of the memories 16, 17, 18 and 72 and the transmittal of read-out coin deposit and coin box removal information from those memories over line 4 toward the switching system 6.

Local Coin Call

When a customer removes the handset 2 from its hookswitch and deposits the number of coins required for an initial period, the coin slot mechanism 7 activates the totalizer 11 to apply a start signal, such as a ground potential, on line 4 for initiating circuit actions in the switching system 6 that causes dial tone to be returned to the call in a manner as described in the aforementioned Busch patent. The caller then dials the called directory number and, in the conventional way, system 6 responds by establishing connections from line 4 through switching network 5 and terminations 54 and 55 of a local coin trunk circuit 56 to a called station 90. Ringing is then applied to station 90 for alerting the called party. After the ringing is answered, the call progresses into its initial period, such as a 3 minute period, the charge for which is covered by the coin deposit in set 1. Timing of the initial period is illustratively performed in a known manner by a timer (not shown) in the local coin trunk circuit 56.

Approximately ½ minute before the expiration of the initial (3 minute) period, the timer (not shown) in trunk circuit 56 initiates a request for access and connection to a coin supervisory circuit 57 via a connector circuit 58 in a conventional manner so that the initial deposit can be collected by applying +130 volts to the calling line. Following its connection to trunk circuit 56, supervisory circuit 57 bids through connector 59 for a connection of a coin processor 60 onto the call while temporarily deferring an application of the +130 volt coin collect potential to the connection toward line 4. Upon connection to the call, processor 60 obtains an automatic number identification of the calling coin station 1 by means of a station identifier 61 in a known manner. Thereafter, identifier 61 is released to serve other calls. At the same time, processor 60 attaches an FSK tone detector and translator 62 to the call connections for a subsequent sensing and translation of FSK signaled coin and coin box removal data from station set 1. Processor 60 next signals the supervisory circuit 57 to apply the +130 volt coin collect potential to line 4 via trunk circuit 56 and network 5.

As priorly described with respect to the circuitry of FIG. 1, whenever a coin collect function takes place, the coin memories 16, 17 and 18 and coin box removal memory 72 of station set 1 are interrogated under control of memory control circuit 26 and the denominations of the coin data stored in memories 16, 17, and 18 and coin box removal data in memory 72 are FSK transmitted by the $F_1$ and $F_2$ tones over the call connections to detector and translator 62. The latter translates the received tones into type 1, 2 and 3 coin counts which are then stored in locations of a memory 63 uniquely assigned to the calling station number identified by identifier 61 and under control of a process control circuit 64. Thereafter, processor 60, connectors 58 and 59, and circuits 57 and 62 are released for serving other calls. As already described, whenever the coin memories at station set 1 are interrogated in connection with a coin collect function, all data therein is erased so that overtime deposits can be counted and stored.

At the end of the initial period, the call timer (not shown) in trunk circuit 56 times-out and in a conventional manner again bids for connection to an idle coin supervisory circuit 57 through connector 58. In turn, circuit 57 again bids for connection to processor 60 via connector 59. Upon connection to the call, processor 60 causes an interrogate tone to be sent from interrogate tone source 65 via the connector 59, circuits 57, 58 and 56, termination 54, network 5 and line 4 for interrogating the coin and coin box removal memories 16, 17, 18, and 72 as priorly described and thereby to check whether or not an overtime deposit has been made. If the FSK tones from station set 1 as translated and processed by processor 60 indicate a sufficient deposit, processor 60 signals the coin supervisory circuit 57 to activate trunk circuit 56 for allowing the call to continue for a prescribed overtime period. Circuits 57 through 65 are then released for serving other calls.

If either an insufficient or no overtime deposit has been made, processor 60 instructs the supervisory circuit 57 to bridge an announcement circuit 66 onto the call for supplying the caller with a conventional overtime announcement and request for deposit. After so instructing circuit 57, processor 60 and circuits 61-65 are released from the call. Approximately 30 seconds after the announcement, supervisory circuit 57 again engages processor 60 via connector 59 in order to make a final overtime deposit check by again sending an interrogate tone from source 65 to station 1 for interrogating memories 16, 17, 18 and 72 as already described. If processor 60 determines from the translated FSK tones from circuit 62 that an appropriate overtime deposit has been made, it instructs supervisory circuit 57 to activate trunk circuit 56 for permitting the call to continue into an overtime period with the timing thereof being conducted in a known manner by a trunk timer (not shown). Circuits 57-65 are then released. If the required deposit has not been made, processor 60 instructs supervisory circuit 57 to terminate the call and release all circuits involved in the call connections.

One-half minute before the end and at the expiration of the first overtime period, the foregoing procedures described for the initial period including the coin collect and interrogate tone operations are repeated in connection with the termination or continuance of the call into another and subsequent overtime periods.

Reference may be made to the aforementioned patent application Ser. No. 819,244 for a complete description of procedures for applying the coin collect and interrogate tones to line 4 during preinitial, initial and overtime periods of a toll call served through system 6.

I claim:

1. A coin box removal information processing arrangement for a coin telephone station (1) having
   a coin box (3) for storing deposited coins,
   a station memory (100) for registering data signals for said coin telephone station and
   a memory control circuit (26) responsive to a receipt of a control signal for examining said memory (100) to read out the registered data signals,
   characterized in that
   said memory (100) comprises
   circuitry (83, 88) responsive to a removal of said coin box (3) from said station (1) for storing a coin box removal signal, and
   said control circuit (26) includes apparatus (87) responsive to an interrogation signal from the central office during a call from said station (1) for activating said circuitry for reading out the stored coin box removal signal from said circuitry (83).

2. A coin box removal information processing arrangement of claim 1 in which
   said station memory (100) comprises coin memory circuitry (16, 17, 18) for registering signals indicating the number of coins deposited in said coin box on each call, and
   said memory control circuit (26) comprises circuitry (104-301) for controlling a sequential readout of said memory (100)
   characterized in that
   said activating apparatus (87) cooperates with said controlling circuitry (104-301) and is responsive to a receipt of a control signal from a central office (6) during said call for sequentially examining said coin memory circuitry (16, 17, 18) and said storing circuitry (83) to read out the registered and stored signals indicating the number of deposited coins and the coin box removal signal.

3. A coin box removal information processing arrangement of claim 2 in which the coin telephone station (1) includes
   a transmitter (35) operable for sending signals from the coin station (1) to a central office (6), and
   in which a processor (89) is responsive to signals received from said transmitter (35) via said central office (6) for accumulating and totalizing the numbers of coins deposited in said coin box (3),
   characterized in that
   said storing circuitry (83) includes apparatus (73, 74) cooperating with said activating apparatus (87) for reading out said stored coin box removal signal and activating said transmitter (35) to send said readout coin box removal signal to said processor (89) for correlation with said totalized numbers of coins deposited in said coin box (3).

4. A coin box removal information processing arrangement for a coin telephone station (1) having
   a coin box (3) for storing deposited coins,
   a station memory (100) for registering data signals for said coin telephone station, and
   a memory control circuit (26) responsive to a receipt of a control signal from the central office during a call from said station for examining said memory (100) to read out the registered data signals,
   characterized in that
   said memory (100) comprises
   circuitry (83) operable for storing a coin box removal signal,
   apparatus (88) responsive to a removal of said coin box (3) from said telephone station for operating said storing circuitry (83) to store said coin box removal signal, and said control circuit (26) includes circuitry (87) for activating said storing circuitry (83) to read out the stored coin box removal signal in response to said control signal.

5. A coin box removal information processing arrangement of claim 4 in which the coin telephone station includes a transmitter (35) operable for sending data indicating signals from the coin station to a central office (6)

characterized in that said storing circuitry (83) comprises gate apparatus (73, 74) cooperating with said activating circuitry (87) for operating said transmitter (35) to send the read-out coin box removal signal to said central office (6).

6. A coin box removal information processing arrangement of claim 5 characterized in that said storing circuitry (83) comprises a memory circuit (72) for storing said coin box removal signal, said activating circuitry (87) in included in a sequencing circuit (36) which is responsive to a receipt of said control signal from said central office (6) for generating a read-out enabling signal, said gate apparatus (73, 74) is responsive to said read-out enabling signal for gating the stored coin box removal signal from said memory circuit (72) to operate said transmitter (35), and said transmitter means (35) comprises a frequency shift key signal means operated by the gated coin box removal signal for sending to said central office (6) an indication signal representing said coin box removal.

7. A coin box removal information processing arrangement of claim 4 characterized in that said storing circuitry (83) includes a bistable memory (72) having first and second states, said operating apparatus (88) comprises components (75, 76, 77) responsive to said coin box removal for generating a pulse signal to operate said bistable memory (72) from said first to said second state and thereby storing said coin box removal signal.

8. A coin box removal information processing arrangement of claim 7 characterized in that said pulse signal generating components comprise a series arrangement of a resistor (76), capacitor (77), a switch (75) and voltage (80, 81) and said switch (75) being connected in response to said coin box removal for connecting said voltage (80, 81) to said resistor (76) and capacitor (77) for generating said pulse.

9. A coin box removal signal processing arrangement of claim 8 characterized in that said bistable memory (72) comprises a "0" and a "1" output and said storing circuitry (83) further includes gate apparatus (73, 74) connected to each said "0" and "1" output and being selectively enabled by said activating circuitry (87) for examining said bistable memory (72) to gate the stored coin box removal signal.

10. A coin box removal information processing arrangement of claim 9 characterized in that said memory control circuit (26) is responsive to a receipt of said control signal from a central office (6) for controlling said examining of said bistable memory (72) to read out the stored coin box removal signal, and in which transmitter (35) is responsive to said stored coin box removal signal gated by said gate apparatus (73, 74) for sending to said central office (6) tone signals indicating said coin box removal.

11. A coin box removal information processing arrangement of claim 4 in which said station memory (100) comprises coin memory circuitry (16, 17, 18) for registering signals indicating the number of coins deposited in said coin box, and said memory control circuit (26) comprises circuitry (104–301) for controlling a sequential readout of said memory circuitry (16, 17, 18), characterized in that said activating circuitry (87) cooperates with said controlling circuitry (104–301) and is responsive to a receipt of signals from a central office (6) for sequentially examining said coin memory circuitry (16, 17, 18) and said storing circuitry (83) to read out the registered and stored signals indicating the number of deposited coins and the coin box removal signal.

12. A coin box removal information processing arrangement of claim 11 in which said coin memory circuitry (16, 17, 18) includes first, second and third type coin registers (19), each of which is responsive to a receipt of respective first, second and third types of coin signals from a coin slot mechanism (7) of said coin telephone for registering said last-mentioned signals, characterized in that said storing circuitry (83) comprises a memory circuit (72) for storing said coin box removal signal and gate means (73, 74) enabled by said memory control circuit (26) for reading out the stored coin box removal signal from said memory circuit (72) sequentially with a readout of signals registered in each of said first, second and third type coin registers.

13. A coin box removal information processing arrangement of claim 12 in which said coin registers (16, 17, 18) each comprise a plural stage (1, 2, 4) binary counter (19) for registering respective first, second and third type coin signals, said memory control circuit (26) comprises circuitry (36) for sequentially examining each stage of each said binary counter to read out the registered signals, said examining means (36) includes a ring counter having a drive input (37) and a plurality of output stages (104–301) for sequentially controlling an examination of each stage of each said binary counter, a pulse generator (38) for supplying ring counter drive pulses and gating circuitry (39, 40) responsive to a receipt of said control signal from said central office (6) for applying said drive pulses from said pulse generator (38) to said drive input for advancing said ring counter (36) from stage-to-stage and thereby effecting a sequential examination of each said binary counter stage, characterized in that
said activating circuitry (87) comprises an output stage of said ring counter (36) cooperating with said memory circuit (72) for reading out the stored coin box removal signal sequentially after said examination of each said binary counter stage.

14. A coin box removal information processing arrangement of claim 4 in which
said station memory (100) comprises a plural stage memory (16, 17, 18) for registering signals indicating the numbers of different types of coins deposited in said coin box (3),
characterized in that
said memory control circuit (26) comprises circuitry (36) operable for sequentially examining each stage of said plural stage memory (16, 17, 18) and said coin box removal signal storing circuitry (83) to read out the registered signals and stored coin box removal signal, and
in which said control circuit (26) comprises means (48, 49, 40) responsive to a receipt of an interrogate signal from a central office (6) for operating said examining means (36).

15. A coin box removal information processing arrangement of claim 14 in which
said memory control circuit (26) further comprises coin collect apparatus (42, 42, 44, 45) responsive to a receipt of a coin collect signal from said central office (6) for operating said examining circuitry (36),
characterized in that
said coin box removal signal storing circuitry (83) includes apparatus (79) activated by said examining circuitry (36) following a readout of the registered signals and said stored coin box removal signal for erasing said stored signal from said coin box removal signal storing circuitry (83).

16. A coin box removal information processing arrangement of claim 15
in which said examining circuitry (36) includes a device (85) for generating a reset signal, and
characterized in that
said erasing apparatus (79) comprises a gate responsiva to a receipt of said reset signal for erasing said stored coin box removal signal from said storing circuitry (83).

17. A coin box removal information processing arrangement of claim 16
in which said memory control circuit (26) further comprises coin return circuitry responsive to a receipt of a coin return signal from said central office (6) for effecting a removal of registered coin signals in each said plural stage memory (16, 17, 18),
characterized in that
said coin return circuitry (51, 52, 53, 91) includes a device (82) for transmitting a signal to said gate apparatus (79) for inhibiting said reset signal from effecting an erasing of said stored coin box removal signal from said storing circuitry (83) in response to a receipt of said coin return signal.

* * * * *

UNITED STATES PATENT AND TRADEMARK OFFICE
CERTIFICATE OF CORRECTION

PATENT NO. : 4,124,775

DATED : November 7, 1978

INVENTOR(S) : Alfred Zarouni

It is certified that error appears in the above-identified patent and that said Letters Patent are hereby corrected as shown below:

Column 11, line 23, the first "in" should be --is--.
Column 11, line 52, "connected" should read --actuated--.
Column 13, line 27, the second "42" should be --41--.
Column 14, lines 12 and 13, "responsiva" should read --responsive--.

Signed and Sealed this

Twenty-ninth Day of May 1979

[SEAL]

Attest:

RUTH C. MASON
Attesting Officer

DONALD W. BANNER
Commissioner of Patents and Trademarks